No. 881,170. PATENTED MAR. 10, 1908.
S. ZIETARSKI.
PROCESS FOR WORKING METALS.
APPLICATION FILED FEB. 26, 1906.
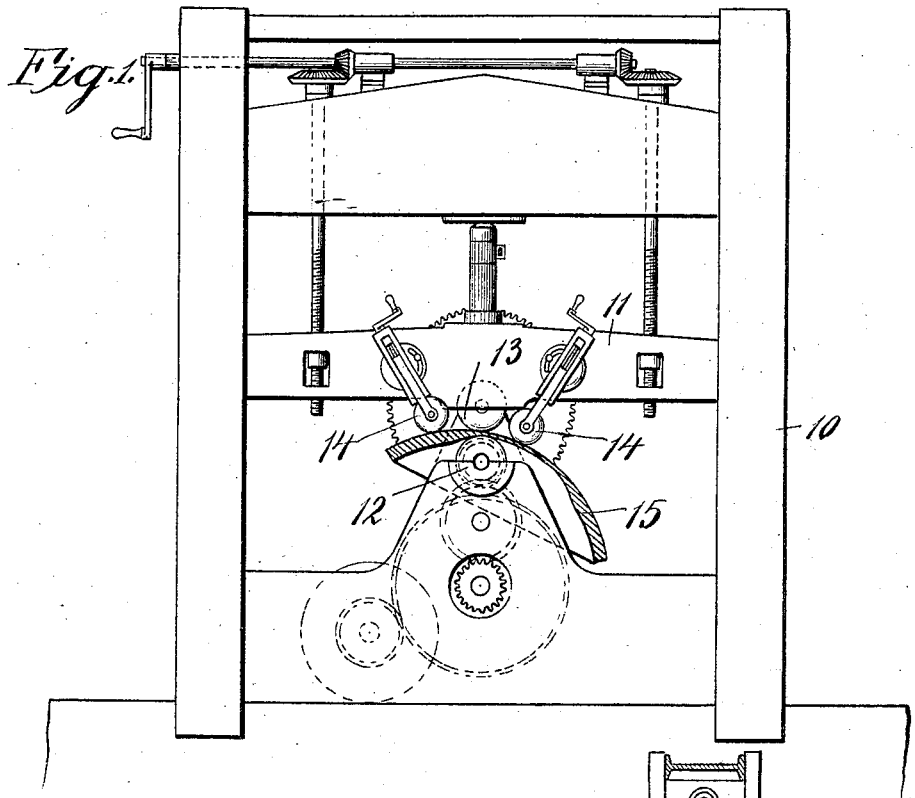
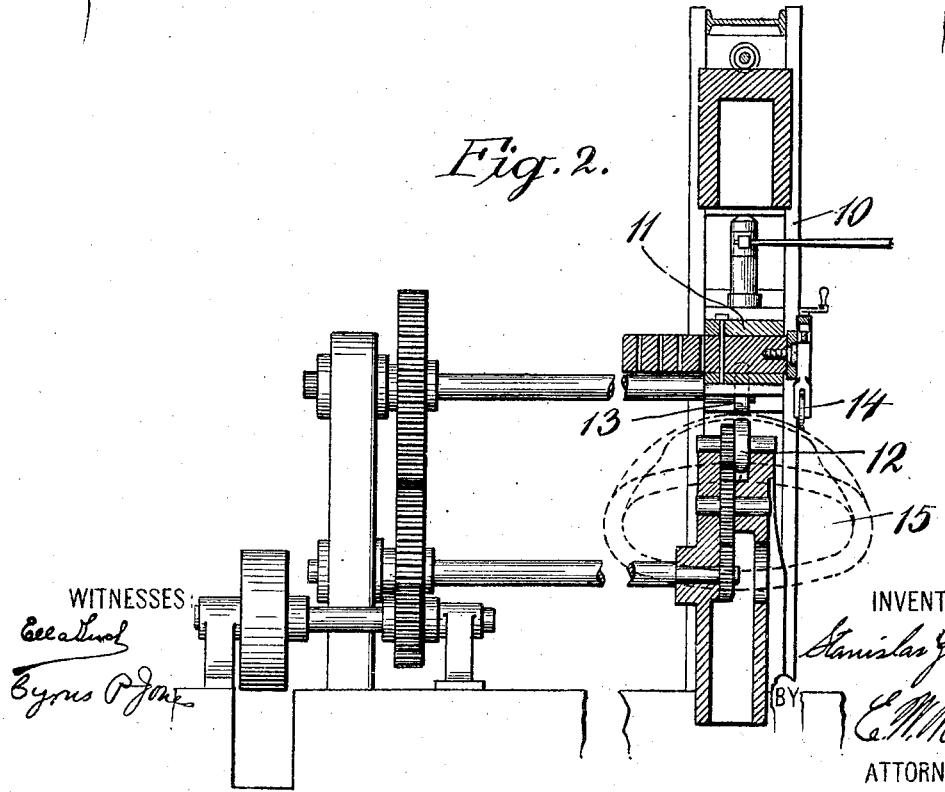
WITNESSES
INVENTOR
Stanislas Zietarski
BY
ATTORNEY
THE NORRIS PETERS CO., WASHINGTON, D.C.

UNITED STATES PATENT OFFICE.

STANISLAS ZIETARSKI, OF NEWARK, NEW JERSEY.

PROCESS FOR WORKING METALS.

No. 881,170.

Specification of Letters Patent.

Patented March 10, 1908.

Application filed February 26, 1906. Serial No. 302,955.

*To all whom it may concern:*

Be it known that I, STANISLAS ZIETARSKI, a citizen of the United States, and a resident of Newark, in the county of Essex and State of New Jersey, United States of America, have invented certain new and useful Improvements in Processes for Working Metal, of which the following is a specification.

My invention relates to a new and useful process of working metals, and its object is to overcome some of the difficulties of processes now in use and to provide a simple and efficient process of manufacturing certain articles of copper or of any other metal which is capable of being rolled.

I will describe my invention in the following specification and point out its novel features in a claim.

Referring to the drawings, Figure 1 is a front elevation and Fig. 2 is a side elevation of a machine for carrying out my invention, showing a piece of metal being rolled and shaped thereby.

In these drawings, 10 designates a frame which supports a movable cross-head 11. A roller 12 is supported in stationary bearings on the frame 10, and another roller 13 is supported in the cross-head 11 directly above roller 12.

14, 14 designate guiding members mounted upon the movable cross-head 11 by means of which a piece of metal 15 being rolled out between rollers 12 and 13 may be pushed down into the required form at the same time it is being acted upon by the rollers. My process is particularly applicable to such metals as are sufficiently ductile to be capable of being rolled, and is especially useful in manufacturing large kettles out of copper.

The metal is first cast into the form of a disk 15 of any desired shape or size; for example, it may be cast or otherwise formed into a flat circular plate having considerable thickness and of substantially the weight which the finished article of manufacture is to have. This disk is then placed between two rollers 12 and 13 of comparatively short length with properly shaped rolling surfaces. These rollers may be driven by any desired power and are arranged to be driven simultaneously and so that they may be driven together with considerable force. The disk or plate is so placed between these rollers that the latter will bear near its central point. The rollers are then brought together so that they compress the disk near its central point and the latter is caused to move by the motion of the rollers. The movement of the disk is then guided by hand or by any suitable mechanism so that it has a circular movement, or rather a spiral movement. The rollers may now be brought toward each other so that their distance apart is equal to the desired thickness of the finished article of manufacture, and, as the disk is moved between these rollers, it will become flattened to the desired thickness thereby. As the disk is thus moved spirally by the rollers, its outer edge may be guided up or down, as may be desired, so that as the metal becomes rolled down to the desired thickness, it will, at the same time, assume the form which the finished article of manufacture is to have. This operation is facilitated by the fact that the portion of the disk which is thus reduced in thickness by the action of the rollers, necessarily becomes greater in area while the other parts of the disk remain unchanged.

This process has been found very useful in rolling kettles of various shapes and is a great improvement over former methods in use for this purpose. The movement of the metal between the rollers is continuous, and the metal is easily guided into shape while it is thus being rolled. This, of course, is obviously a great saving in time and trouble over the former method of rolling articles of manufacture of this nature by a reciprocating movement or by forming them by hammering. In fact, it has been found that metals or alloys, which are not capable of being formed by the hammering process, may be successfully made by this process. The continuous rolling of the metal between rollers under pressure has a tendency to solidify the metal itself.

The rollers may be of any desired shape, and in fact, different shaped rollers are used for different shaped articles of manufacture, and in some cases, different shaped rollers are used for forming different parts of the same article of manufacture.

While I have described this invention as used in the manufacture of copper kettles I do not mean to limit myself to this specific use as my process may be used with other kinds of metals and for forming other kinds of articles of manufacture. It is particularly adaptable for forming circular kettles, but it may be also used to manufacture articles of other forms, as, for example, elliptical dishes or vessels.

What I claim is:

1. The herein described method of working metals which consists in reducing the thickness of and shaping a metal blank by rolling pressure applied first to the portion which is within the periphery, reducing the thickness of said inner portion and thereby enlarging its area more rapidly than the portions toward the periphery, at the same time permitting the blank to dish or buckle.

2. The herein described method of working metals which consists in reducing the thickness of a metal blank by submitting it to pressure between two horizontally mounted rolls, said pressure being first applied to a portion of the blank which is within its periphery reducing the thickness of said inner portion and thereby enlarging its area more rapidly than the portions toward the periphery permitting the blank to dish or buckle, and at the same time guiding the dished blank vertically into the required form.

In testimony whereof, I have signed my name to this specification in the presence of two subscribing witnesses.

STANISLAS ZIETARSKI.

Witnesses:
 JOSEPH E. CAVANAUGH,
 ELLA TUCH.